(12) United States Patent
Kamiya et al.

(10) Patent No.: US 8,798,790 B2
(45) Date of Patent: Aug. 5, 2014

(54) APPARATUS AND METHOD FOR DETECTING CONTACT POSITION OF ROBOT

(75) Inventors: Yosuke Kamiya, Kitakyushu (JP); Yasuyuki Inoue, Kitakyushu (JP); Hideo Nagata, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 487 days.

(21) Appl. No.: 13/043,493

(22) Filed: Mar. 9, 2011

(65) Prior Publication Data

US 2011/0270443 A1     Nov. 3, 2011

(30) Foreign Application Priority Data

Apr. 28, 2010 (JP) ................................ 2010-102935

(51) Int. Cl.
*G06F 19/00* (2011.01)

(52) U.S. Cl.
USPC ........... 700/245; 700/247; 700/249; 700/251; 700/253; 700/258; 318/567; 318/568.1; 318/568.12; 318/568.16; 318/568.2

(58) Field of Classification Search
USPC ................. 700/245, 247, 249, 251, 253, 258; 318/567, 568.1, 568.12, 568.16, 568.2; 901/1, 2, 10, 34, 46
See application file for complete search history.

(56) References Cited

U.S. PATENT DOCUMENTS

| | | | |
|---|---|---|---|
| 5,806,518 A * | 9/1998 | Mittelstadt | 600/407 |
| 6,539,642 B1 * | 4/2003 | Moriyasu et al. | 33/551 |
| 6,668,466 B1 * | 12/2003 | Bieg et al. | 33/503 |
| 7,753,851 B2 * | 7/2010 | Nilsson | 600/459 |
| 8,626,341 B2 * | 1/2014 | Ando et al. | 700/260 |
| 2002/0011092 A1 * | 1/2002 | Hara et al. | 73/1.13 |
| 2006/0225505 A1 * | 10/2006 | Mitsuhashi | 73/514.18 |
| 2007/0021738 A1 * | 1/2007 | Hasser et al. | 606/1 |
| 2007/0205785 A1 * | 9/2007 | Nilsson | 324/754 |
| 2008/0021317 A1 * | 1/2008 | Sumanaweera | 600/437 |

(Continued)

FOREIGN PATENT DOCUMENTS

| | | |
|---|---|---|
| CN | 1906550 | 1/2007 |
| CN | 101166951 | 4/2008 |

(Continued)

OTHER PUBLICATIONS

Japanese Office Action for corresponding JP Application No. 2010-102935, Jul. 11, 2012.

(Continued)

*Primary Examiner* — Khoi Tran
*Assistant Examiner* — Jaime Figueroa
(74) *Attorney, Agent, or Firm* — Mori & Ward, LLP

(57) ABSTRACT

An apparatus for detecting a contact position where a robot makes contact with an object includes a probe, a probe-position calculating unit, a contact detecting unit, and a contact-position calculating unit. The probe is attached to the robot and is configured to make a displacement in a direction of making contact with the object in an elastic manner. The probe-position calculating unit calculates a position of the probe of the robot in operation. The contact detecting unit detects a contact state of the probe with the object. When the contact state of the probe is detected, the contact-position calculating unit derives the contact position based on a calculated position of the probe.

15 Claims, 11 Drawing Sheets

(56) References Cited

U.S. PATENT DOCUMENTS

| | | | |
|---|---|---|---|
| 2008/0051927 A1 | 2/2008 | Prestidge et al. | |
| 2008/0235970 A1* | 10/2008 | Crampton | 33/503 |
| 2009/0025463 A1 | 1/2009 | McFarland et al. | |
| 2009/0099576 A1* | 4/2009 | Wang et al. | 606/130 |
| 2009/0163929 A1* | 6/2009 | Yeung et al. | 606/130 |
| 2009/0192522 A1* | 7/2009 | Blumenkranz | 606/130 |
| 2009/0248037 A1* | 10/2009 | Prisco | 606/130 |
| 2011/0005342 A1* | 1/2011 | Treat et al. | 73/865.8 |
| 2011/0270443 A1 | 11/2011 | Kamiya et al. | |
| 2011/0283553 A1 | 11/2011 | McFarland et al. | |

FOREIGN PATENT DOCUMENTS

| | | | |
|---|---|---|---|
| CN | 101193603 | 6/2008 | |
| CN | 202037605 U | 11/2011 | |
| JP | 60-025696 | 2/1985 | |
| JP | 60-161085 | 8/1985 | |
| JP | 60-238290 | 11/1985 | |
| JP | 60-256960 | 12/1985 | |
| JP | 03240104 A * | 10/1991 | G05B 19/403 |
| JP | 2793695 B2 | 1/1992 | |
| JP | 04-340605 | 11/1992 | |
| JP | 5-329787 | 12/1993 | |
| JP | 2709001 B2 | 12/1993 | |
| JP | 2003254746 A * | 9/2003 | G01B 21/30 |

OTHER PUBLICATIONS

Extended European Search Report for corresponding EP Application No. 11157113.9—1239, Dec. 6, 2012.

Chinese Office Action for corresponding CN Application No. 201110054369.7, Mar. 21, 2014.

* cited by examiner

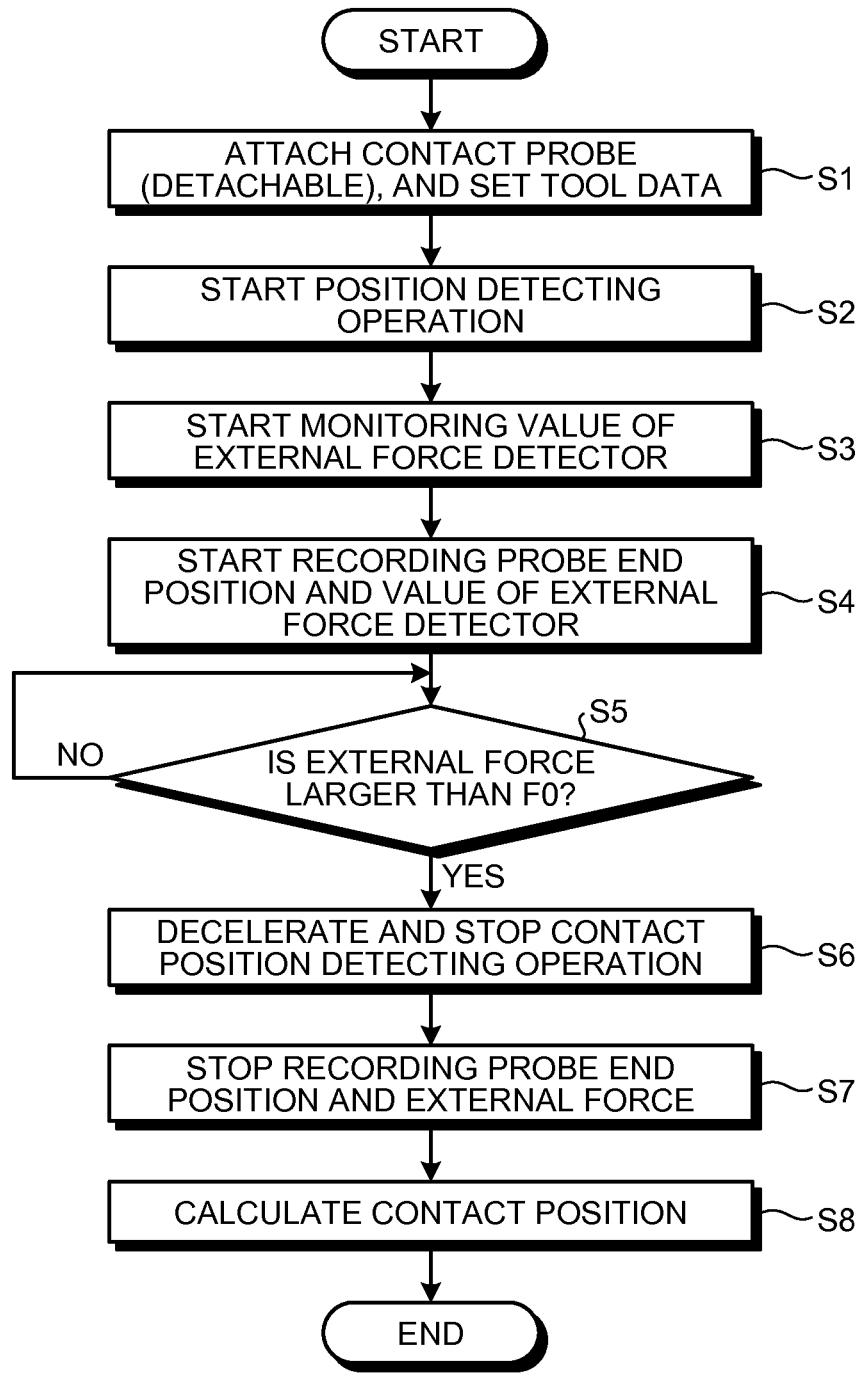

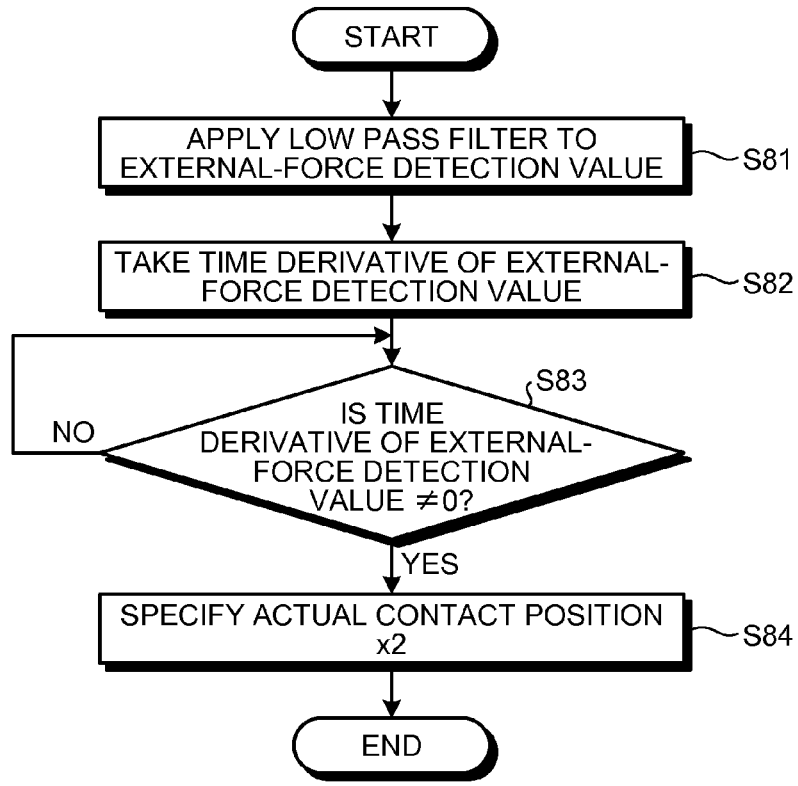
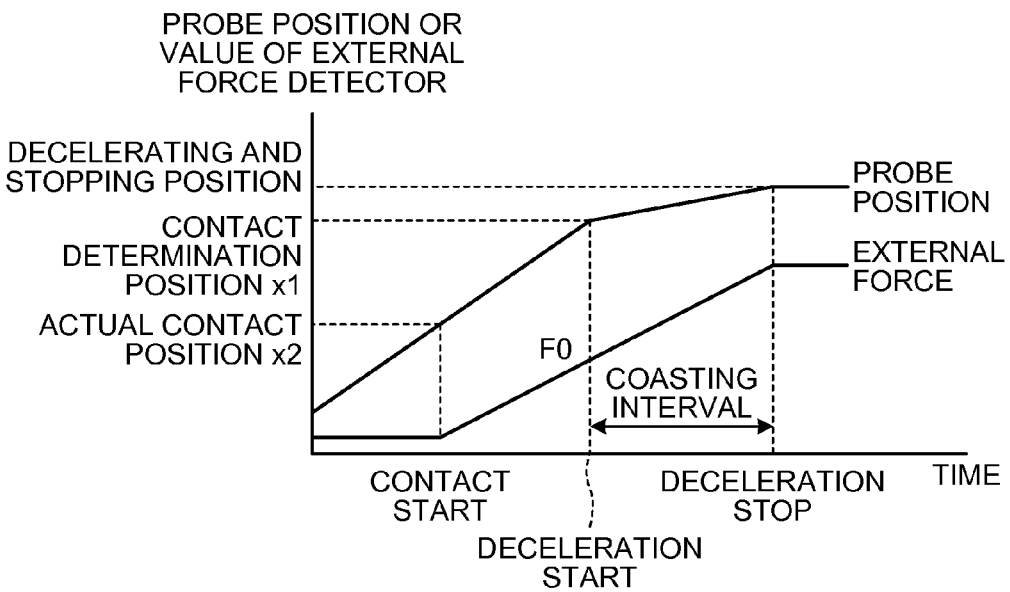

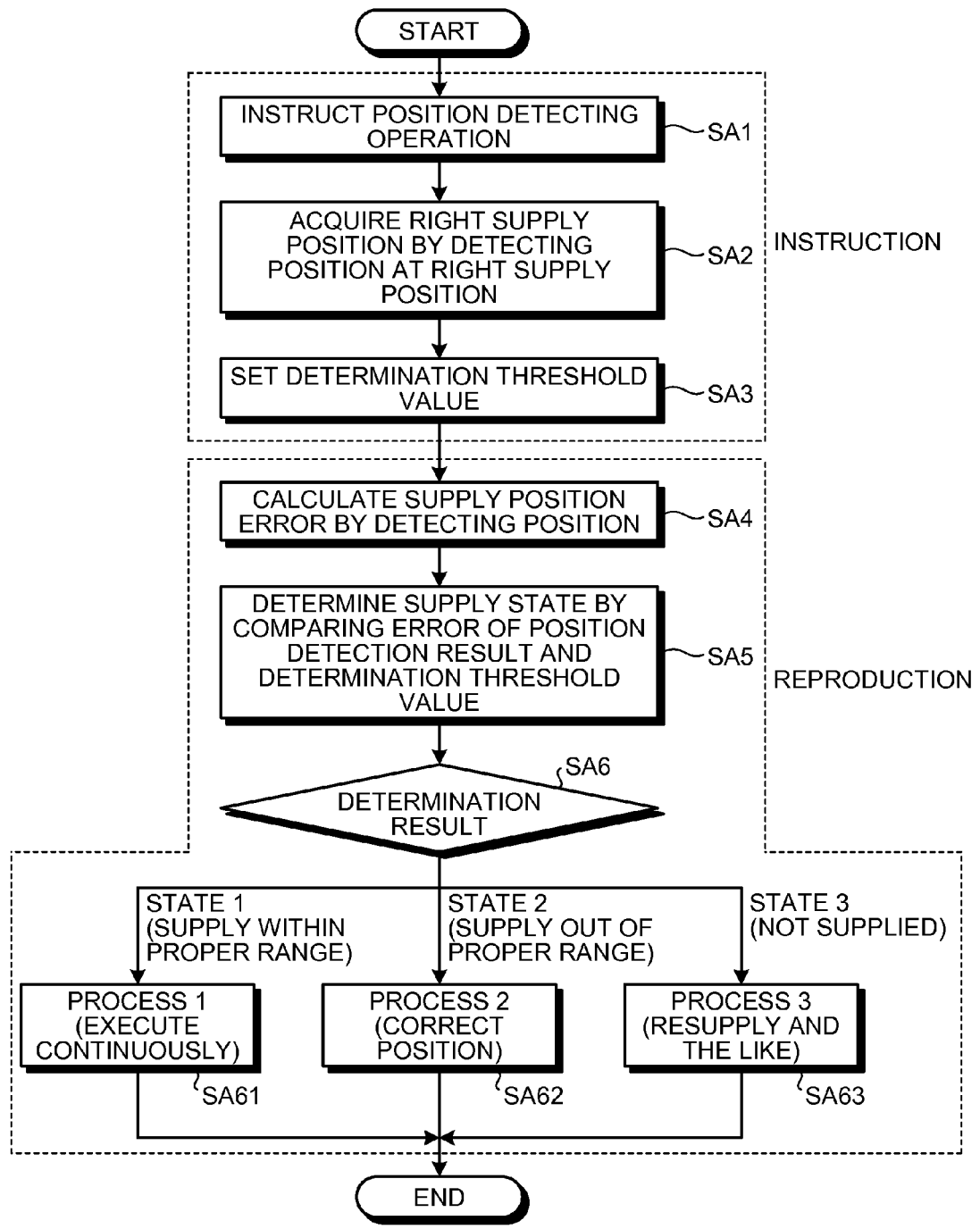

APPARATUS AND METHOD FOR DETECTING CONTACT POSITION OF ROBOT

CROSS-REFERENCE TO RELATED APPLICATION

This application is based upon and claims the benefit of priority of the prior Japanese Patent Application No. 2010-102935, filed on Apr. 28, 2010, the entire contents of all of which are incorporated herein by reference.

FIELD

The embodiments discussed herein are directed to an apparatus and a method for detecting a contact position of a robot.

BACKGROUND

When performing an operation using a robot, there can be an error between a position (or a defined coordinate system) of a workpiece instructed in advance as an operation program and an actual position (or a defined coordinate system) of the workpiece. Therefore, it is necessary to perform a process of locating a position of the workpiece before starting an operation, and when there is an error, correcting the error. Noncontact sensing means, such as a laser or an image, is generally used as position detecting means for detecting the position of the workpiece. However, because procedures of receiving and processing a reflected light from an object is taken in the noncontact sensing method, there is a common technical problem that accurate position detection may not be possible depending on surface material of the object or lighting condition.

To solve such a technical problem, contact sensing methods have been proposed, as disclosed in Japanese Patent No. 2709001, Japanese Laid-open Patent Publication No. 04-340605, Japanese Laid-open Patent Publication No. 60-161085, Japanese Laid-open Patent Publication No. 60-238290, and Japanese Patent No. 2793695. In a contact position detecting method of a robot employing the contact sensing method, procedures of monitoring a contact force exerted on the robot and calculating the contact position from a position of the robot at a contact time are taken.

However, in the contact position detecting method employing the conventional contact sensing method, because a contact portion of a robot that makes contact with the workpiece is a rigid body, it is necessary to suppress the operation speed at the time of contact. Therefore, as the number of contact points of the robot with the workpiece increases, the detection of the contact point is delayed, and the operation efficiency is degraded.

SUMMARY

An apparatus according to an aspect of embodiments is an apparatus for detecting a contact position where a robot makes contact with an object, including a probe, a probe-position calculating unit, a contact detecting unit, and a contact-position calculating unit. The probe is attached to the robot and is configured to make a displacement in a direction of making contact with the object in an elastic manner. The probe-position calculating unit calculates a position of the probe of the robot in operation. The contact detecting unit detects a contact state of the probe with the object. When the contact state of the probe is detected, the contact-position calculating unit derives the contact position based on a calculated position of the probe.

BRIEF DESCRIPTION OF DRAWINGS

FIG. 2 is a flowchart of a process procedure of the contact position detecting apparatus of a robot according to the first embodiment;

FIG. 3 is a flowchart of a process procedure of a contact-position detecting operation according to the first embodiment;

FIG. 4 is a schematic diagram for explaining a contact position detecting method shown in FIG. 3, depicting a probe position and an external force;

FIG. 11 is a flowchart of a process according to a fifth embodiment when causing a robot to perform an operation using the contact position detecting apparatus of a robot according to the first or fourth embodiment;

DESCRIPTION OF EMBODIMENTS

Figure 1:
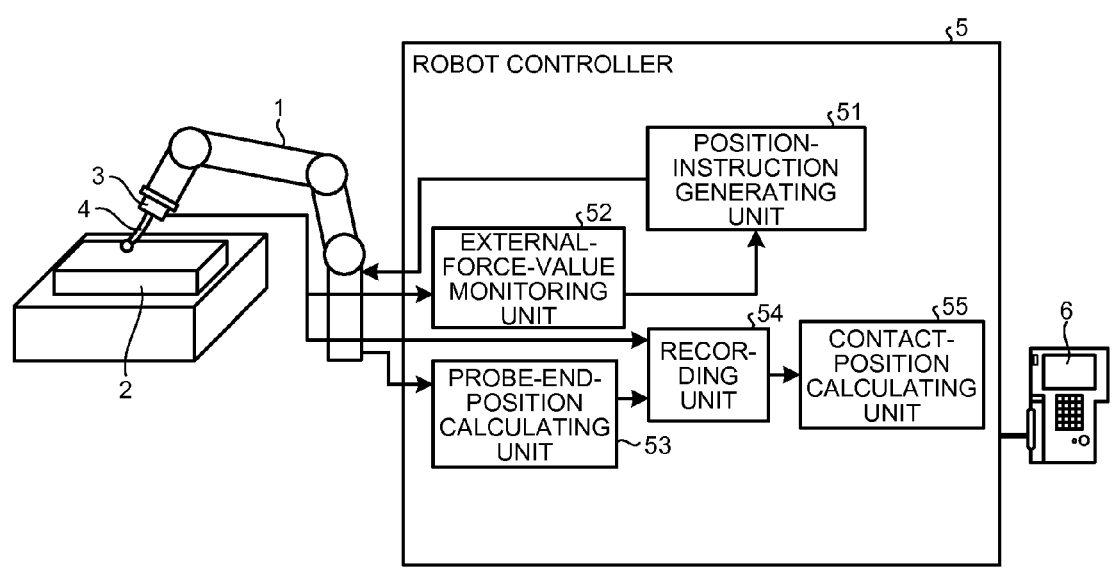
FIG. 1 is a configuration diagram of a contact position detecting apparatus of a robot according to a first embodiment.

An apparatus according to an embodiment is an apparatus for detecting a contact position where a robot makes contact with an object, including a probe, a probe-position calculating unit, a contact detecting unit, and a contact-position calculating unit. The probe is attached to the robot, which is configured to make a displacement in a direction of making contact with the object in an elastic manner. The probe-position calculating unit calculates a position of the probe of the robot in operation. The contact detecting unit detects a contact state of the probe with the object. When the contact state of the probe is detected, the contact-position calculating unit derives the contact position based on a calculated position of the probe. It is preferable that the apparatus further include a decelerating and stopping unit that controls the robot to decelerate and stop when the contact state of the probe is detected.

The probe according to the present embodiment can adopt an optional configuration as long as it can make a displacement in the direction of making contact with the object in an elastic manner. For example, it can be constituted by a material having elasticity (a piano wire) or can adopt a configuration including at least one elastically deforming area (a spring). Although the probe can be attached to a position near an end effector of the robot, which detects a contact state of the robot, the present embodiment is not limited thereto. Furthermore, although "the position of the probe" calculated by the probe-position calculating unit according to the present embodiment can be a position of a portion of the probe that is assumed to be brought into contact with the workpiece (for example, a distal end of the probe), the present embodiment is not limited thereto.

According to the present embodiment, because a probe that is configured to make a displacement in the direction of making contact with the object in an elastic manner is used, after the contact state is detected in operation of the robot, it is possible to secure a coasting distance to stop the robot (a distance from a point where the probe is brought into contact with the object to a point where the robot stops). That is, even if the robot moves a predetermined distance after the probe is brought into contact with the object, the probe is never damaged with no plastic deformation, or in an opposite manner, the workpiece is never damaged or deformed with no vibration or shift. Therefore, there is no necessity of bringing the robot into contact with the workpiece at low speed, and as a result, it is possible to obtain a position of a target object with high accuracy without losing high speed property that is a feature of the robot. In addition, because the obtained position is a value calculated as the position of the probe, which can be obtained as a relative position between the robot and the target object, it can be obtained as unique information required for the robot.

The position detecting apparatus according to the present embodiment further includes an external-force detecting unit that detects an external force applied to the probe and a recording unit that records therein the external force detected by the external-force detecting unit and the position of the probe calculated by the probe-position calculating unit in a time series manner. When the contact state of the probe is detected, the contact-position calculating unit obtains a contact time of the probe based on the external force recorded in the recording unit and derives a position of the probe at a recorded contact time as the contact position of the robot.

According to the present embodiment, in operation of the robot, the external-force detecting unit detects the external force applied to the probe, and the recording unit records therein the external force detected by the external-force detecting unit and the position of the probe calculated by the probe-position calculating unit in a time series manner. "Recording in a time series manner" means recording information in such a manner that generation time or order of recording information can be found. For example, it includes recording information in order of sampling in a sequential manner. The contact detecting unit then determines that the probe is in the contact state, for example, when the external force applied to the probe exceeds a predetermined value. It is preferable that the predetermined value be set to a value larger than a value of the external force detected when the probe is actually brought into contact with an object in order to assure the state of the probe having contact with the object. This makes it possible to detect the contact state for sure without being substantially affected by noise or vibration of the workpiece.

When the contact state of the probe is detected, the contact-position calculating unit obtains a contact time of the probe based on the external force recorded in the recording unit. It is preferable that the contact-position calculating unit obtain a time when a temporal change of a value of the external force recorded in the recording unit changes as the contact time. An example of "the temporal change of the value of the external force" is "a time derivative value of the external force". In this case, for example, the contact-position calculating unit takes a time when the external force derivative value is changed from zero (indicating a state where the probe is not brought into contact with any object) to a value exceeding zero (indicating that the probe is brought into contact with an object so that a force is applied to the probe) or a time when the external force derivative value is changed from a value larger than zero to zero as the contact time. The contact position calculating unit then derives a position of the probe, that is, a real "contact position" by searching the recording unit. The "temporal change of the value of the external force" is not limited to the derivative value, but can be a value obtained by averaging a plurality of external force sampling values. For example, an intersection of an approximate line of the external force sampling value (the temporal change of the value of the external force) in a time interval in which the contact state is not detected by the contact detecting unit and an approximate line of the external force sampling value in a time interval in which the contact state is detected can be obtained as the "contact time" at which the temporal change of the value of the external force is changed. In this manner, in the present embodiment, by providing means for recording the external force value and the position of the probe, it is possible to achieve a new effect that an accurate contact position is obtained with high reliability by, for example, searching the contact position or performing a total of two times of checks when making contact with the object and when departing from the object.

In a preferred aspect, a noise-reduction filtering process having the same temporal characteristic is performed on the detected external force and calculated position of the probe. With this operation, it is possible to obtain accurate contact position without causing a shift in a correspondence relation between the contact time and the probe position by performing a process having an equivalent delay on both the recorded external force value and probe position. As for the purpose of the filtering process, the external force value is used for the noise reduction and the calculated position of the probe is used to give a delay time equivalent to a delay of filtering the external force value.

In the present embodiment, the contact detecting unit is configured as a sensor that electrically detects the contact state by a current conduction. Because the present embodiment employs a sensor that electrically detects the contact state by a current conduction, it is possible to detect the contact state at the instant at which the probe is brought into contact with the object. Therefore, it is possible to derive a position of the probe at the time when the contact state is detected by the current conduction as the contact position. In this case, it is possible to dispense with the external-force detecting unit and the recording unit described above.

Preferably, the apparatus according to the present embodiment includes an upper-level controller that controls the robot, the robot includes servo motors and a motor control system that controls the servo motors based on an instruction from the upper-level controller. The upper-level controller includes a built-in calculation model for simulating the motor control system. The probe-position calculating unit calculates the position of the probe by using an output value obtained when instruction data to the servo motors is input to the calculation model. In this manner, in the present embodiment, the apparatus is divided into the robot and the upper-level controller to avoid a communication load. Therefore, in the present embodiment, even when encoder information from the lower-level robot is not used, angle information with no position deviation can be obtained because the upper-level controller includes the built-in calculation model for simulating the motor control system, and as a result, it is possible to detect accurate contact position.

Preferably, the probe is configured to be attached to the robot in a detachable manner or to be stored in the robot. With this configuration, it is possible to obtain a device configuration that can be used with no interference with a workpiece or a nearby object in operation of the robot.

In a method for detecting the contact position of the robot according to the present embodiment, a probe that is configured to make a displacement in a direction of contacting with an object in an elastic manner is attached to the robot. The method for detecting the contact position of the robot according to the present embodiment then includes performing a position control of the robot, calculating a position of the probe, and detecting a contact state of the probe with the object. When the contact state of the probe is detected, the method for detecting the contact position of the robot according to the present embodiment includes decelerating and stopping the robot and deriving the contact position based on a calculated position of the probe.

The method for detecting the contact position of the robot according to the present embodiment further includes detecting an external force applied to the probe and recording a detected external force and calculated position of the probe in a time series manner. The step of detecting a contact state of the probe with the object includes detecting the contact state of the probe based on the detected external force. When the contact state of the probe is detected, the step of deriving the contact position includes obtaining a contact time of the probe based on a recorded external force and deriving a position of the probe at a recorded contact time as the contact position of the robot.

In the method for detecting the contact position of the robot according to the present embodiment, the step of detecting a contact state of the probe with the object includes detecting the contact state electrically by a current conduction. The step of deriving the contact position includes deriving a position of the probe at a time when the contact state is detected by the current conduction as the contact position.

Exemplary embodiments of an apparatus and a method for detecting a contact position of a robot disclosed in the present application will be explained below in detail with reference to the accompanying drawings.

A first embodiment is explained first.

FIG. 1 is a configuration diagram of a contact position detecting apparatus of a robot 1 according to the first embodiment. As shown in FIG. 1, the contact position detecting apparatus according to the first embodiment includes a robot controller 5, a probe 4, and an external force detector 3. The robot controller 5 controls the robot 1 that is driven by servo motors (not shown) including encoders. The probe 4 is attached to the robot 1 for detecting a position of a workpiece 2. The external force detector 3 detects an external force applied to the probe 4. In the first embodiment, an explanation is given with an example of a force sensor as the external force detector 3. In addition, a teaching pendant 6 through which an instruction from a user for instructing a predetermined operation to the robot 1 can be input is connected to the robot controller 5. Although a 6-axis vertical articulated type is adopted as the robot 1 shown in FIG. 1, it is possible to apply the contact position detecting apparatus according to the first embodiment to other type of the robot 1 in which the number of axes and axis configuration are changed in an arbitrary manner.

The probe 4 is configured to make a displacement in a direction of making contact with the workpiece 2 in an elastic manner. For example, the probe 4 can be configured to have a predetermined elastically deforming area (in the predetermined elastically deforming area, a reaction force is generated according to a deformation amount, and at the same time, it is restored to its original shape and position in a repeated manner). Therefore, in the following descriptions, the probe 4 is referred to as a flexible probe as appropriate. However, it does not mean that the entire area of the probe is elastic, but means that at least the portion or a unidirectional component has the elasticity. In addition, the probe 4 is configured to increase the flexibility of position detection by making contact with the workpiece not exclusively in one direction but from multiple directions as a contact direction. It is preferable that the probe 4 have a length to avoid any interference between the robot 1 itself and the workpiece 2 when making contact with the workpiece 2 in a position detecting operation. For example, the probe 4 can be formed with a piano wire. Furthermore, it is preferable that a distal end of the probe 4 be formed in a spherical shape such that the contact direction is not restricted. Although it appears that a spherical object is attached to the distal end of the probe 4 in FIG. 1, it is just schematic, and the end of the probe (a piano wire) itself can be machined in the spherical shape. However, the probe 4 according to the first embodiment is not limited to thereto, but as long as it has an area that is configured to make a displacement in the direction of making contact with the workpiece in an elastic manner, it can be modified as appropriate.

Furthermore, the probe 4 can be a retractable type that protrudes only when the probe is needed, not to impair workability of the robot 1. Alternatively, the probe 4 can be configured to be attached to the robot 1 in a detachable manner. In addition, although the probe 4 is directly attached to the external force detector 3 in the example shown in FIG. 1, it can also be attached to an end effector of the robot 1.

The robot controller 5 can execute a function that is required for causing the robot 1 to detect the position of the workpiece 2. Therefore, the robot controller 5 includes a position-instruction generating unit 51, an external-force-value monitoring unit 52, a probe-end-position calculating unit 53, a recording unit (memory) 54, and a contact-position calculating unit 55. The position-instruction generating unit 51 generates an instruction to be supplied to the servo motor for performing a position control of the robot 1. The external-force-value monitoring unit 52 monitors a value of a force applied to the probe 4 detected by the external force detector 3, and determines whether the probe 4 is in a contact state based on the value of the force. When the probe 4 is in the contact state, the external-force-value monitoring unit 52 instructs the position-instruction generating unit 51 to cause the robot 1 to perform an operation that is described later. The probe-end-position calculating unit 53 calculates a position where the probe 4 is brought into contact with an object based on a value of each axis encoder transmitted from the robot 1, a design dimension of the probe 4, a mounting position of the probe 4, and an approach direction of the probe 4. The position where the probe 4 is brought into contact with an object is, for example, the position of the distal end of the probe 4. The recording unit 54 records therein the value of the force detected by the external force detector 3 and the position of the probe calculated by the probe-end-position calculating unit 53 in a time series manner in contact operation of the robot 1. The contact-position calculating unit 55 calculates, when it is determined that the probe 4 is in the contact state by the external-force-value monitoring unit 52, an actual contact position based on the external force value and the probe end position recorded in the recording unit 54. The teaching pendant 6 is used to set an execution of a contact operation of the robot, a detection threshold of a force sensor value, an offset value for calculating the actual contact position from a contact detection position, and a setting value of a dimension of the probe, and a determination threshold of the workpiece 2 for a feeding state.

FIG. 2 is a flowchart of a process procedure of the contact position detecting apparatus according to the first embodiment. A process procedure of the contact position detecting apparatus of a robot according to the first embodiment is explained using FIG. 2 with reference to FIG. 1. As shown in FIG. 2, the probe 4 is first attached to a place near the end effector of the robot 1 and operation tool data (position attitude of the contact-position detecting probe 4 viewed from an end position of the robot 1) is input through the teaching pendant 6 at Step S1. If the probe is detached when the contact position detection is not performed, it does not hinder a normal operation of the robot. The design values of the robot 1 and the contact-position detecting probe 4 can be used as the operation tool data. If accurate design values and mounting position of the probe 4 are not known, a separate calibration (correction) can be performed. A method of determining the operation tool data includes, for example, the following method. A contact with the workpiece 2 is achieved by using the contact-position detecting probe 4 under a condition that a position and an attitude of the workpiece 2 and an arm position and an attitude of the robot 1 are known in a robot coordinate system, and "difference (vector)" between the arm position and the attitude of the robot 1 and the position and the attitude of the workpiece 2 at a contact time is determined as the operation tool data of the probe 4. The robot coordinate system is a Cartesian coordinate system with a first axis of the robot as the origin, a back-and-forth direction as an X-direction, a left-and-right direction as a Y-direction, and an up-and-down direction as a Z-direction.

Subsequently, a position detecting operation is started at Step S2. The position detecting operation can be performed through a jog operation using the teaching pendant 6 by an operator or running of an operation that is instructed in advance. The jog operation is an operation for moving the robot 1 only during the operator is pressing a key of the teaching pendant 6 and stopping the robot 1 upon releasing the key. The external-force-value monitoring unit 52 starts monitoring the value of the force sensor at Step S3, and the recording unit 54 starts recording the probe end position and the value of the force sensor at Step S4. The probe-end-position calculating unit 53 then calculates the probe end position by adding the dimension of the probe 4 to a value of a robot end position (probe mounting position) obtained by forward converting the value of each axis encoder of the robot.

To detect the probe end position with higher accuracy, the probe-end-position calculating unit 53 can calculate a probe end position Ptop by adding a probe radius R to a probe end sphere center position Ptcp according to an approach direction of the probe in the position detecting operation as indicated by (Equation 1). (Equation 1) represents a case division of the approach direction in an operation with reference to the robot coordinate system. When the operation is performed from a direction other than the case division, a calculation taking a direction with more movement amount as the approach direction does not affect the accuracy. For example, it is assumed that an approach (I) is made from the negative direction to the positive direction on the X-axis when an approach operation is performed by 200 millimeters from the negative direction to the positive direction on the X-axis and 10 millimeters from the positive direction to the negative direction on the Y-axis.

(Approach from negative direction to positive direction on X-axis)

(Approach from positive direction to negative direction on X-axis)

(Approach from negative direction to positive direction on Y-axis)

(Approach from positive direction to negative direction on Y-axis)

(Approach from negative direction to positive direction on Z-axis)

(Approach from positive direction to negative direction on Z-axis)  (Equation 1)

At Step S5, the external-force-value monitoring unit 52 monitors whether the value of the force sensor exceeds a set threshold value F0 at regular intervals. When the value of the force sensor exceeds F0, the external-force-value monitoring unit 52 determines that a contact is detected, and transmits a contact position detection signal to the position-instruction generating unit 51. Upon receiving the contact position detection signal, the position-instruction generating unit 51 performs a position control on the robot 1 to decelerate and stop the robot and retract the robot to a start position of the position detecting operation (Step S6). Although the robot 1 keeps on moving by the coasting distance of the robot 1 (a distance from a point where the probe 4 is brought into contact with the object to a point where the robot 1 stops), the coasting distance of the robot 1 is absorbed by the flexibility of the probe 4. Therefore, the probe 4 is never damaged or deformed, or in an opposite manner, the workpiece 2 is never damaged or deformed with no vibration or shift. The value F0 is set to a value larger than a force caused by a vibration that can be normally generated on a robot arm (a mechanical vibration caused by the operation of the robot, an electrical noise generated in measurement of the force sensor and the like) in order to make sure that it is determined that the probe 4 is in the contact state in a higher rate. Alternatively, the value F0 can be externally changed by using the teaching pendant 6 of the robot 1 and the like. Sampling periods of the processes at Steps S3, S4, and S5 are set to satisfy a necessary resolution of the contact position detection. Specifically, the sampling periods of the processes at Steps S3, S4, and S5 are set to values smaller than a value obtained by dividing the necessary position detection resolution by a detecting operation speed.

When the sampling periods are already determined, the position detection resolution is determined from the detecting operation speed. Upon receiving the contact position detection signal, it stops recording the probe end position and the value of the force sensor at Step S7. At Step S8, the contact-position calculating unit 55 performs a process of calculating the contact position at which the probe 4 is brought into contact with the workpiece 2 from the probe end position and the value of the force sensor recorded in the recording unit.

At Step S5 in FIG. 2, to eliminate an error in the contact detection due to a disturbance such as vibration and to make it possible to surely detect the contact state, F0 is set to a value larger than a force normally generated when the probe is brought into contact with the object. Therefore, as shown in FIG. 4, a contact determination position (x1) determined at Step S5 differs from an actual contact position (x2) of the probe 4 obtained as a rising position of the value of the external force, which is a position more advanced in an operation direction of the robot arm. For this reason, in the first embodiment, when the contact state of the probe 4 is detected, the contact-position calculating unit 55 performs a process of calculating the actual contact position from previous external force value and probe position recorded in the recording unit 54.

Figure 5:
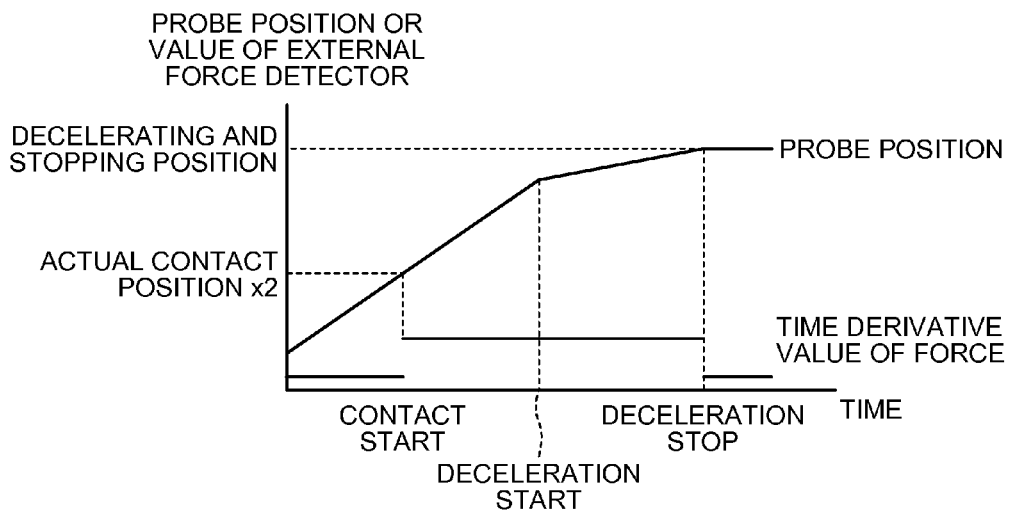
FIG. 5 is a schematic diagram for explaining the contact position detecting method shown in FIG. 3, depicting derivative values of the probe position and the external force.

FIG. 3 is a flowchart of a procedure of calculation process for obtaining the contact position by the contact-position calculating unit 55, and FIGS. 4 and 5 are schematic diagrams for explaining a contact-position detecting process. The contact-position detecting process performed at Step S8 in FIG. 2 is sequentially explained using these drawings.

As shown in FIG. 3, at Step S81, a low pass filter is applied to the external-force detection value detected by the force sensor 3 to eliminate a noise component superimposed on the external-force detection value. It is preferable to use a low pass filter having a sharp cut-off frequency characteristic, where the cut-off frequency can be changed as appropriate in response to characteristics of the robot. In addition, in the first embodiment, a low pass filter is also applied to the value of the distal end position of the probe 4 calculated by the probe-end-position calculating unit 53. It is preferable to perform a noise-reduction filtering process having the same temporal characteristic as the one applied to the external force value. With this operation, signals having the same delay can be associated with each other, which makes it possible to enhance the detection accuracy of the contact position.

Subsequently, a time derivative of the force sensor value is calculated by a difference calculation at Step S82. It is then determined whether the time derivative of the force sensor value is zero for each sample at Step S83. As shown in FIG. 5, a probe end position at a time when the time derivative of the force sensor value exceeds zero or becomes smaller than zero is taken as the actual contact position x2 (Step S84). The time when the time derivative of the force sensor value exceeds zero is corresponding to a time when the probe 4 is brought into contact with the workpiece 2 from a state where it is not brought into contact with anything. The time when the time derivative of the force sensor value becomes smaller than zero is corresponding to a time when the probe 4 makes a transition from a state where the probe 4 has contact with the workpiece 2 to a state where the probe 4 is detached from the workpiece 2 so that it does not have contact with anything. That is, in the first embodiment, there exist two times of chances for detecting the contact position at the time of making contact with the workpiece 2 and at the time of detaching from the workpiece 2, where both times can be used for detecting the contact position. By comparing the contact positions at the time of making contact and at the time of being detached and confirming that both contact positions match with each other, it is possible to enhance the reliability of the contact-position detecting process. As a case where the contact positions at the time of making contact and at the time of being detached do not match each other, it can be considered that the workpiece 2 is deformed or shifted with the contact operation.

In the first embodiment, the time derivative of the force sensor value is employed to obtain the actual contact position at Steps S82 and S83 in the process of calculating the actual contact position from the recorded probe end position and the force sensor value. However, the method for obtaining the contact position is not limited thereto. For example, there are methods, such as a method of obtaining an approximate line of the force sensor value from an actual contact until the robot is decelerated and stopped from the following (1) and (2), calculating an approximate line in an interval in which the robot does not make contact with the workpiece by similarly sampling the time and the force sensor value, and calculating the actual contact position from the time and the force sensor value at an intersection of both lines. When the force sensor value does not exceed the threshold value F0 because there exists no workpiece 2 or because of some other reason, the contact position detection cannot be performed, and in this case, a position detection process error signal is output to the outside.

(1) a time and a force sensor value at a moment when it is determined to have contact in the force sensor value
(2) a time and a force sensor value at a moment a predetermined time before the moment when it is determined to have contact In this manner, according to the first embodiment, because the contact-position detecting operation is performed using a flexible probe 4 and the robot is stopped by decelerating the contact operation speed after the contact detection, it is possible to perform the position detection in a rapid manner even at a speed comparable to a normal operation speed of a robot employing a noncontact sensing method. As a result, it is possible to improve considerably the operation efficiency compared to the conventional contact sensing method. In addition, in the first embodiment, because a filtering is applied to the probe end position and the force sensor value, it is determined whether the derivative value of the force sensor value is zero, and the actual contact position is calculated from the probe end position at the time when the derivative value exceeds zero or becomes smaller than zero, it is possible to enhance the accuracy in the contact position detection of the robot. Furthermore, in the first embodiment, because the probe position and the external force are recorded in the recording unit 54 in a time series manner, making it possible to search the external force and the contact position over a plurality of previous samples, it is possible to obtain an accurate contact position with high reliability.

Figure 6:
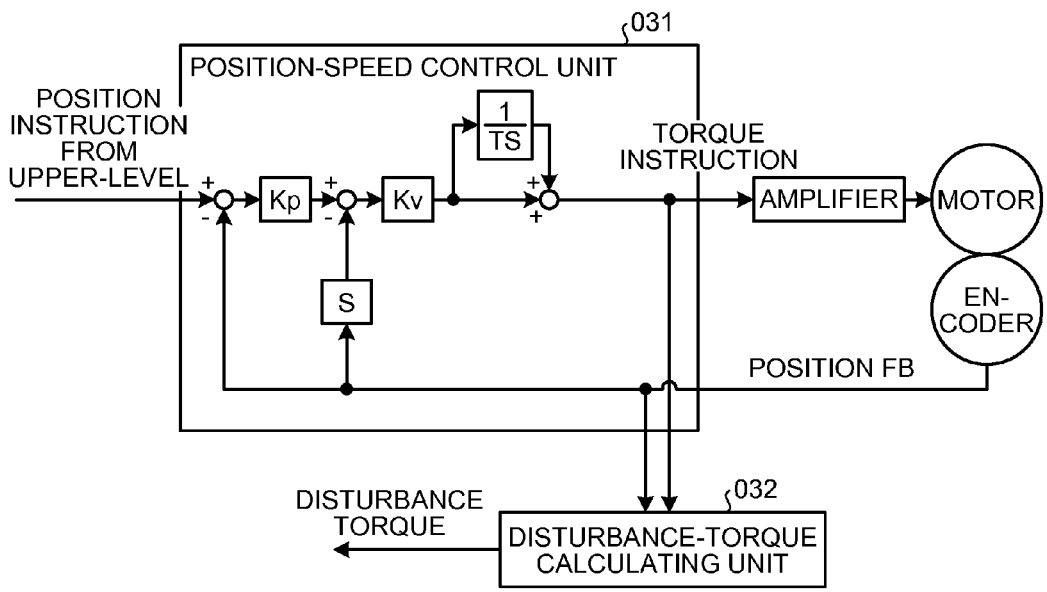
FIG. 6 is another example of an external force detector employed in the contact position detecting apparatus according to the first embodiment.

Although the external force detector 3 is explained as the force sensor according to the first embodiment, the external force detector 3 is not limited to this configuration, but the force sensor can be substituted by other types of sensor as long as the external force can be detected, such as a film-type pressure sensor and a force detector using a disturbance torque that is represented by a difference between a torque instruction value and a load torque. An example of the external force detector using the disturbance torque that is represented by a difference between the torque instruction value and the load torque is shown in FIG. 6. FIG. 6 is a block diagram for explaining the force detector using the disturbance torque that is represented by a difference between the torque instruction value and the load torque. The disturbance torque is calculated by a disturbance-torque calculating unit 032 using a torque instruction and a position FB (feedback) in a normal position-speed control unit 031 of a robot. A method of calculating the disturbance torque includes, for example, a method of obtaining an angular acceleration from a second-order derivative of the position feedback, calculating a feedback torque by multiplying it by an inertia moment of a motor load, and taking a difference between the torque instruction and the feedback torque as the disturbance torque. However, the method of calculating the disturbance torque is not limited thereto. The contact state can be detected by calculating the disturbance torque at a predetermined cycle.

A second embodiment is explained next.

In the first embodiment, the contact state is determined with high reliability by the external-force-value monitoring unit 52 using the value of the force detected by the force sensor. However, in the second embodiment, a contact position detecting apparatus employing a sensor that electrically detects the contact state by a current conduction instead of the force sensor is provided.

Figure 7A:
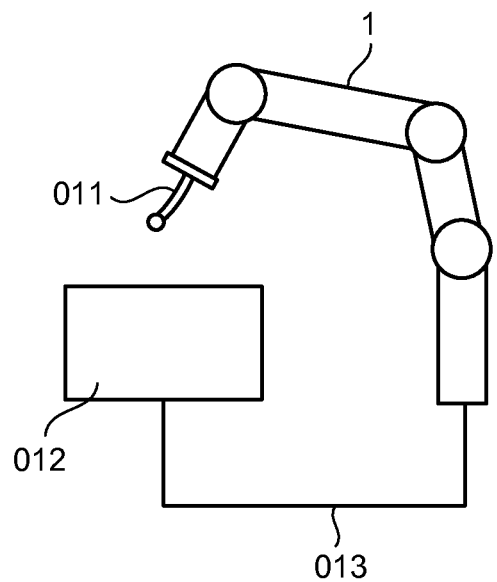
FIG. 7A is a configuration diagram of relevant parts of a contact position detecting apparatus of a robot according to a second embodiment.

FIG. 7A depicts a robot 1 provided with a sensor that electrically detects the contact state by a current conduction, according to the second embodiment. As shown in FIG. 7A, the robot 1 and a workpiece 012 are electrically connected to each other with an electrical connection line 013. A conduction detecting probe 011 attached to an end of the robot 1 is brought into contact with the workpiece 012, a current flows through the workpiece 012, and the conduction detecting probe 011 detects the current, by which the contact state can be detected. In a similar manner to the first embodiment, the conduction detecting probe 011 is configured to make a displacement in a direction of making contact with the workpiece 012 in an elastic manner.

Therefore, in the second embodiment, it is possible to adopt a position of the probe at a time when the conduction detecting probe 011 detects a contact as it is as an actual contact position, which eliminates a necessity of calculating the contact position retrospective to previous data. Therefore, the robot controller 5 according to the second embodiment can be configured without the recording unit 54 and the contact-position calculating unit 55 among the constituent elements shown in FIG. 1. In addition, a conduction monitoring unit that monitors the current conduction of the conduction detecting probe 011 is employed instead of the external-force-value monitoring unit 52. The conduction monitoring unit issues an instruction for decelerating and stopping the robot to the position-instruction generating unit 51 at a time when the current conduction of the probe, that is, the contact, is detected. The probe-end-position calculating unit 53 outputs a probe end position calculated at the time when the current conduction, that is, the contact, is detected by the conduction monitoring unit as the actual contact position.

In the second embodiment, because the conduction detecting probe 011 is a flexible probe, it is possible to decelerate and stop the robot without abruptly stopping it at the instant of detecting the contact. Therefore, in the second embodiment, it does not put a heavy load on a decelerator of the robot. In addition, in the second embodiment, because it can dispense with the recording unit and the like, it is possible to detect the contact position with a simpler configuration. However, it is matter of course that it is also possible to use the recording unit, in the same manner as the first embodiment, to perform the position detection retrospective to the past when detecting the current conduction so as to make more definite that the contact position can be detected with high reliability by performing a reconfirmation whether the contact position at the time of the current conduction is a right contact position.

A third embodiment is explained next.

In the first embodiment, the contact state is determined by the external-force-value monitoring unit 52 using the value of the force detected by the force sensor. However, in the third embodiment, a contact position detecting apparatus employing a contact sensor instead of the force sensor is provided.

Figure 7B:
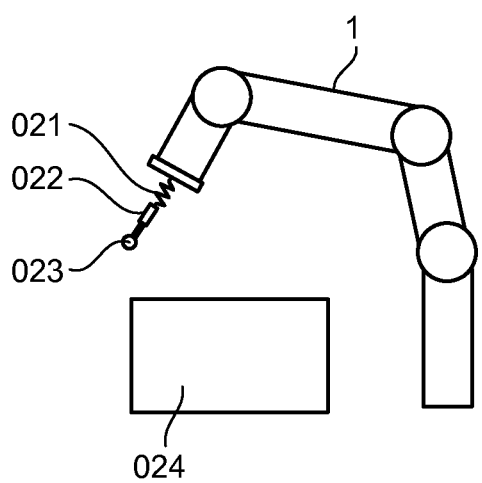
FIG. 7B is a configuration diagram of relevant parts of a contact position detecting apparatus of a robot according to a third embodiment.

FIG. 7B depicts a robot 1 provided with a contact sensor, according to the third embodiment. The contact sensor can be achieved by attaching a switch 022 to an end of the robot 1 via an elastic member 021 such as a spring and attaching a rigid probe 023 at a tip of the switch 022. The switch 022 is a switch that outputs an electrical signal by being switched on when a predetermined amount of displacement is generated on the elastic member 021. An electrical signal for detecting a contact is output from the switch 022 when the rigid probe 023 is brought into contact with a workpiece 024 by an operation of the robot 1. With this operation, the contact sensor can detect the contact state. When the contact state is detected, in the same manner as the first embodiment, an instruction for decelerating and stopping the robot is issued to the position-instruction generating unit 51, and a position where the rigid probe 023 is actually brought into contact with the workpiece 024 is obtained from the external force value and the probe end position recorded in a recording unit.

The rigid probe 023 is constituted by a rigid member to increase the sensitivity of the contact sensor (time or displacement amount from a contact to receiving a predetermined amount of displacement and outputting a contact signal), and a decelerating (coasting) distance of the robot from the contact time is absorbed by the elastic member 021. More specifically, it suffices that the rigid probe 023 have characteristics including higher elasticity (characteristic of having larger reaction force against displacement amount) than the elastic member 021. In this manner, the third embodiment has a distinct feature in that the probe has both a function of detecting the contact state and an elastic displacement function.

A fourth embodiment is explained next.

In each of the above embodiments, the upper-level robot controller transmits an instruction signal to the servo motors of the lower-level robot, and calculates a position of the robot from encoder signals transmitted from each axis of the robot. However, in the fourth embodiment, an apparatus that calculates a position of the robot not from the encoder information but based on an instruction signal to the robot is provided.

Figure 8:
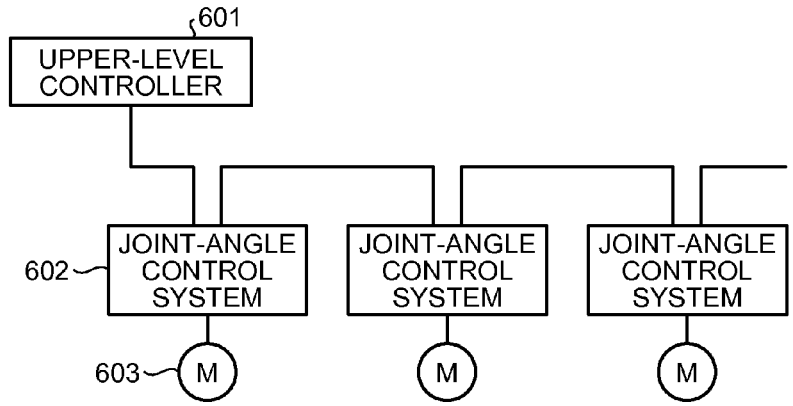
FIG. 8 depicts a configuration of a general control device for explaining a contact position detecting apparatus according to a fourth embodiment.

FIG. 8 depicts a general configuration of a controller that transmits angle instructions of servo motors 603 by a communication with an upper-level controller 601. An operation instruction of the robot generated by an operation program is generated as a position instruction (an angle instruction) of the servo motors 603 that drives joints of the robot by an inverse conversion of robot mechanics, and its value is transferred to each motor control system 602 through a transmission line such as a serial communication.

The detection value from the force sensor attached to the robot arm is subject to a coordinate conversion, so that the stored operation instruction and the coordinate system match each other. The coordinate conversion means a calculation process using a coordinate conversion matrix that defines a position attitude relation between the robot coordinate system and the force sensor coordinate system (if it is a 3-axis sensor, for example, forces in the XYZ-axis direction defined on the sensor can be detected, and the defined XYZ axes are changed according to a direction of mounting the sensor). However, according to precision and sensitivity of a desired position detection and versatility of the detection process, it suffices to limit a sensor specification to be used and the above calculation process. For example, if it is only for the position detection, the coordinate systems are not necessarily to be matched, and about the direction of detecting the force, it suffices if at least one direction or more can be detected. In addition, the sensor is not necessarily to be attached to the arm, and the contact can be detected by a external force detector or a torque detector mounted on a joint axis. Furthermore, by employing a force sensor that detects forces in three directions (XYZ-axis directions), it is possible to detect the contact regardless of the position detecting operation direction. The accurate contact position can be calculated according to an approach direction by using the coordinate conversion matrix that defines a relation between the force sensor coordinate system and the robot coordinate system, which enhances the accuracy in the position detection. Moreover, by calculating a resultant force of the three directions, it becomes possible to detect the contact with less contact force by the resultant force, which enhances the contact sensitivity.

Also in the fourth embodiment, the robot is decelerated and stopped in a range of elastic deformation of the probe after the detection value of the force exceeds the threshold value, as described in the first embodiment. Thereafter, the contact point is obtained based on a rising time of the recorded force and the recorded position information. The detection value of the force sensor is subject to a filtering process because it generally has a sharp fluctuation. In the fourth embodiment, it is possible to obtain an accurate contact position without generating a shift in the correspondence relation between the rising time and the position by performing a process having equivalent delay on both the recorded force detection information and position information.

Although it is described here about a filtering process in the Cartesian coordinate system at the upper-level controller 601, the same effect can be obtained by performing the filtering process on the force information and the position information recorded in the joint-angle coordinate system in the first embodiment.

Figure 9:
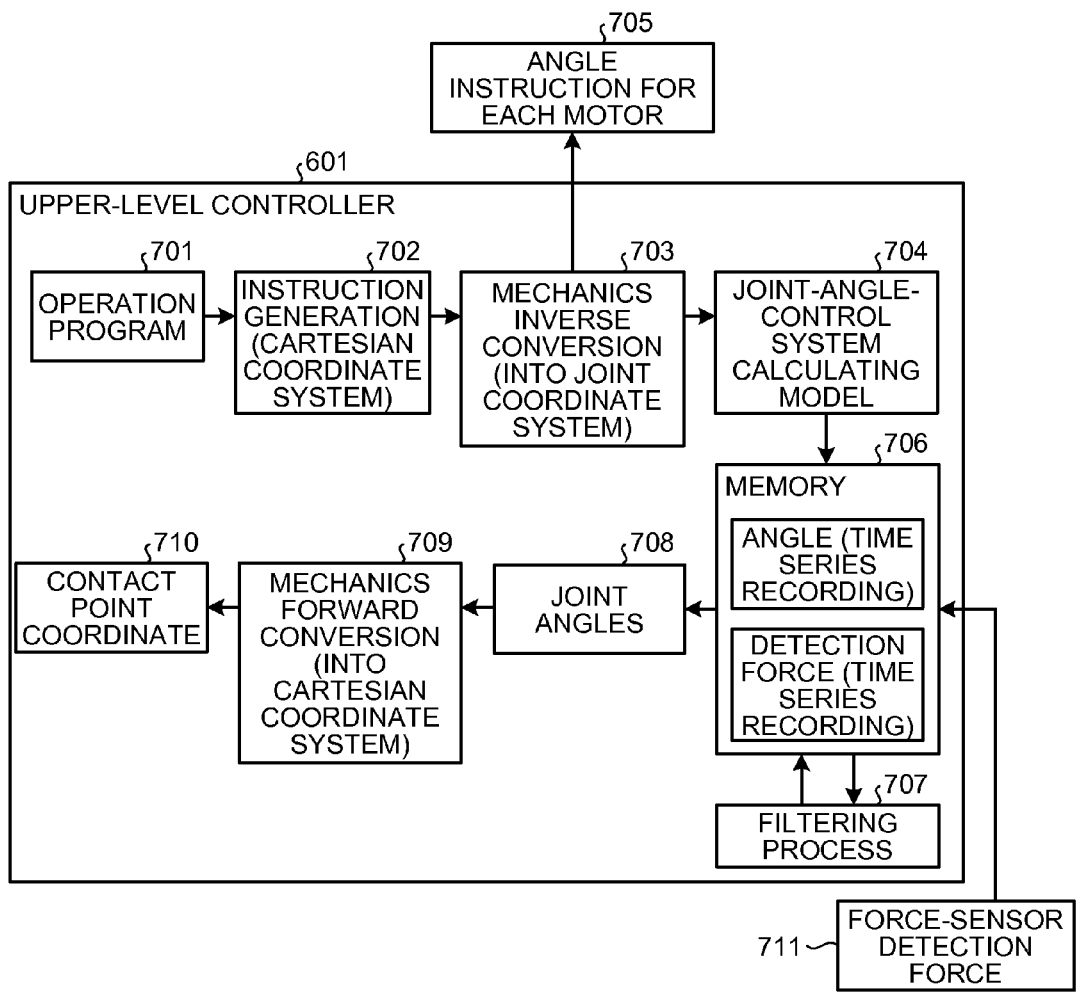
FIG. 9 is a schematic diagram for explaining an internal process of an upper-level controller when obtaining a contact position in a joint-angle coordinate system according to the fourth embodiment.

An internal process of the upper-level controller 601 according to the fourth embodiment is explained in detail below with reference to FIGS. 9 and 10. FIG. 9 depicts the internal process of the upper-level controller 601 when obtaining the contact position in the joint-angle coordinate system, and FIG. 10 depicts the internal process of the upper-level controller 601 when obtaining the contact position in the Cartesian coordinate system.

In the internal process of the upper-level controller 601 shown in FIG. 9, an operation program 701 of a robot is generated in advance by an instruction or a tool such as a simulator. When the operation program 701 is operated, an instruction 702 for causing the robot to execute a specific movement in the Cartesian coordinate system is generated. The generated instruction 702 is converted into an instruction 705 to the joint-angle coordinate system by an inverse conversion 703 to operate joints of the robot, and is transmitted to servo motors 603 of each joint of the robot. When the robot makes contact with a workpiece or the like during an operation, a detection force 711 of a force sensor is measured, and joint angles 708 at a contact time is obtained by a method such as the one described in the first embodiment. At that time, although the joint angle information and the force sensor information recorded in a memory 706 are used, it is possible to eliminate a shift of the contact point obtained from a change of the force sensor value by performing a process 707 such as a filter having the equivalent time constant on both the recorded position information and the force sensor information. The joint angles 708 at the contact time is converted into a contact point coordinate 710 of the Cartesian coordinate system from the joint-angle coordinate system by a mechanics forward conversion 709. The upper-level controller 601 determines an operation to be executed next based on the contact point coordinate 710. Furthermore, the instruction values converted into the joint-angle coordinate system by the inverse conversion 703 are merely an instruction value given to the joint-angle control system of the robot (602 in FIG. 8), and they do not necessarily match the actual detection angles of the servo motors (603 in FIG. 8). Therefore, if the instruction values obtained by the inverse conversion 703 are used as they are, there is a possibility of generating shifts from the detection angles at the actual joint. To solve this problem, a joint-angle-control system calculating model 704 for simulating the joint-angle control system (602 in FIG. 8) for the motors of the robot (603 in FIG. 8) is incorporated in the upper-level controller 601. The upper-level controller 601 then calculates angles with no shift from the actual detection angles of the motors by inputting instruction values of the inverse conversion 703 to the calculating model 704, and records the calculated angles in the memory 706. With this operation, in the fourth embodiment, the joint angle information with no position shift can be obtained without using the encoder information from the robot, and as a result, it becomes possible to detect an accurate contact position.

Figure 10:
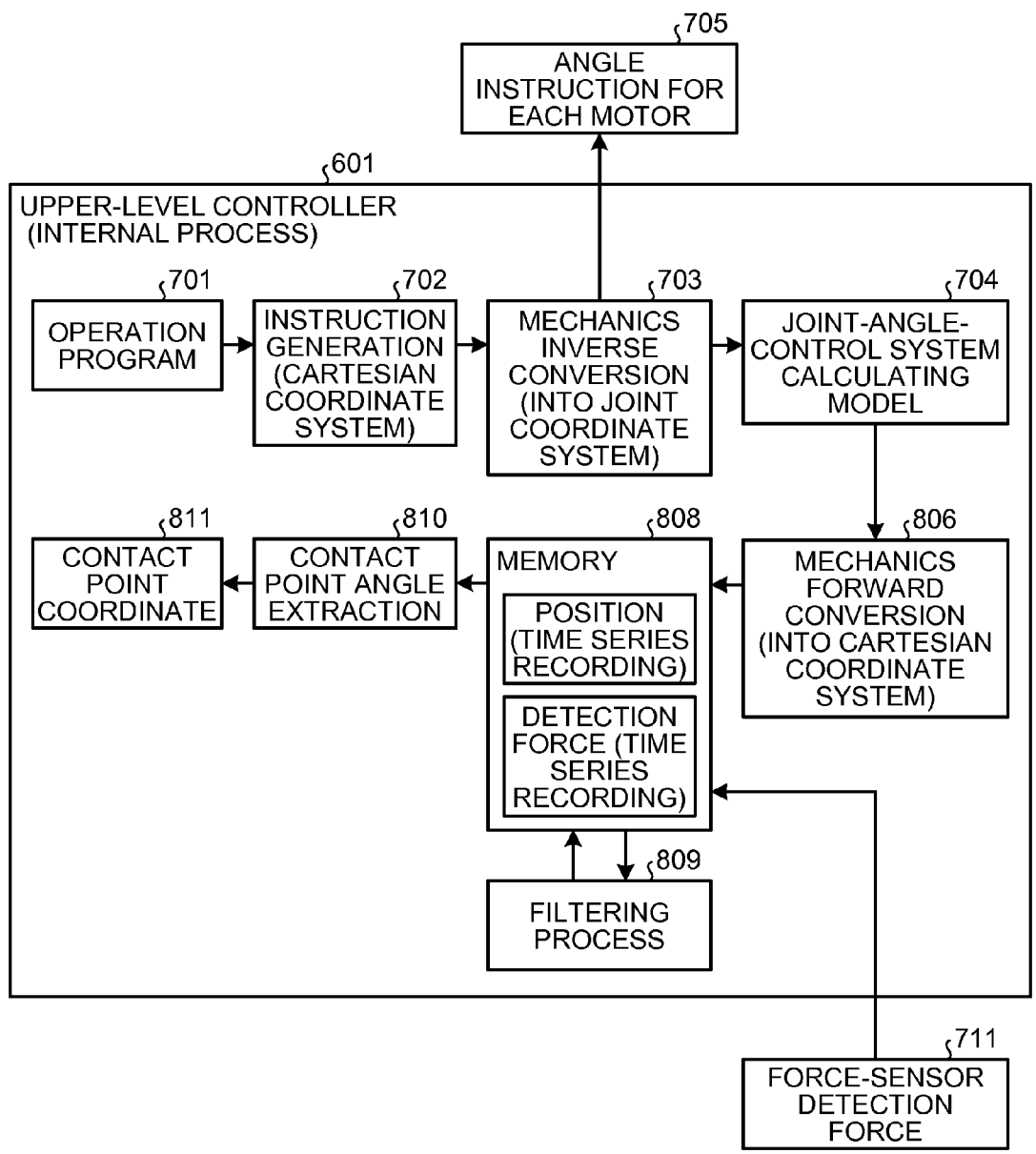
FIG. 10 is a schematic diagram for explaining an internal process of an upper-level controller when obtaining a contact position in a Cartesian coordinate system according to the fourth embodiment.

Although the case of contact position detection with the joint angle has been described above, the case of employing the position information obtained in the Cartesian coordinate system can take the same effect as shown in FIG. 10. The only difference with FIG. 9 is that the information to be recorded in the memory is in the Cartesian coordinate system, so that the basic principle is the same as the case of the joint-angle coordinate system.

A fifth embodiment is explained next.

A method according to the fifth embodiment is sequentially explained using FIGS. 11 and 12. The fifth embodiment is an example in which the contact position detecting method used in the apparatus according to the first or fourth embodiment is applied to an operation of a robot. That is, in the fifth embodiment, for the workpiece (part) supplied in a manufacturing line or the like, the contact position detection is performed for each supply. The fifth embodiment then determines a supply state based on an error in the supply position (a difference between a right supply position and each supply position), and performs a process according to the determination result. Constituent elements in the fifth embodiment identical to those in the first embodiment are denoted by like reference numerals and detailed explanations thereof will be omitted.

Figure 12A:
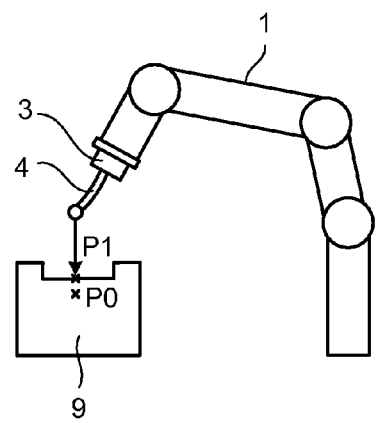
FIG. 12A is a configuration diagram of an operation of the robot upon instructing a press position to the robot when a target object (part) is not supplied to a supply pallet according to the fifth embodiment.
Figure 12B:
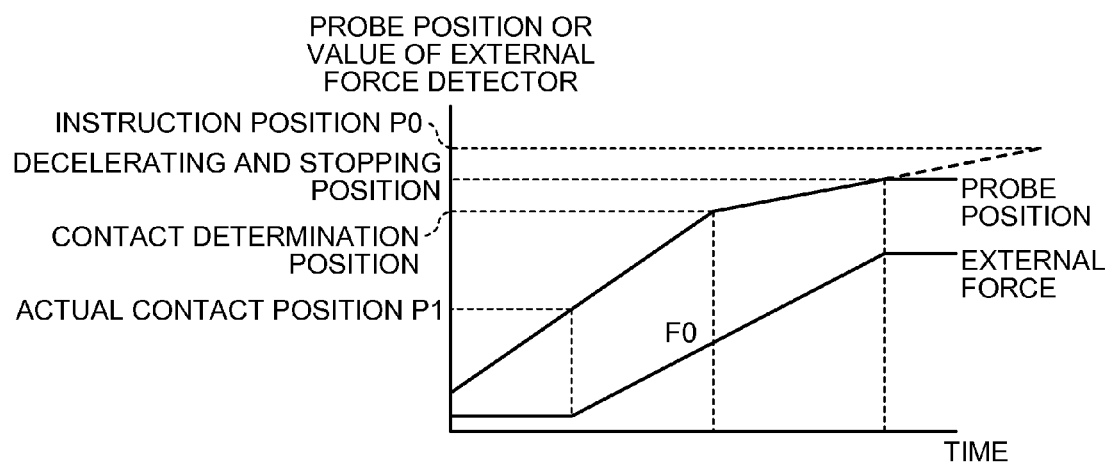
FIG. 12B is a graph of temporal changes of an external force and a probe position in the case shown in FIG. 12A.
Figure 12C:
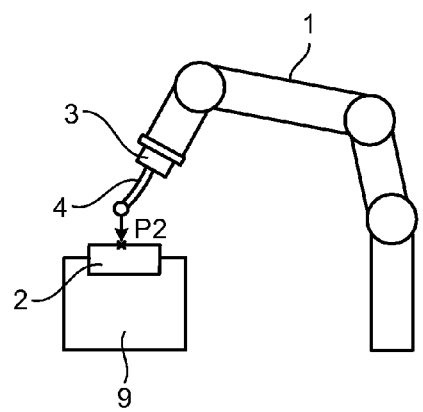
FIG. 12C is a configuration diagram of an operation of the robot when a target object (part) is supplied to a supply pallet according to the fifth embodiment.
Figure 12D:
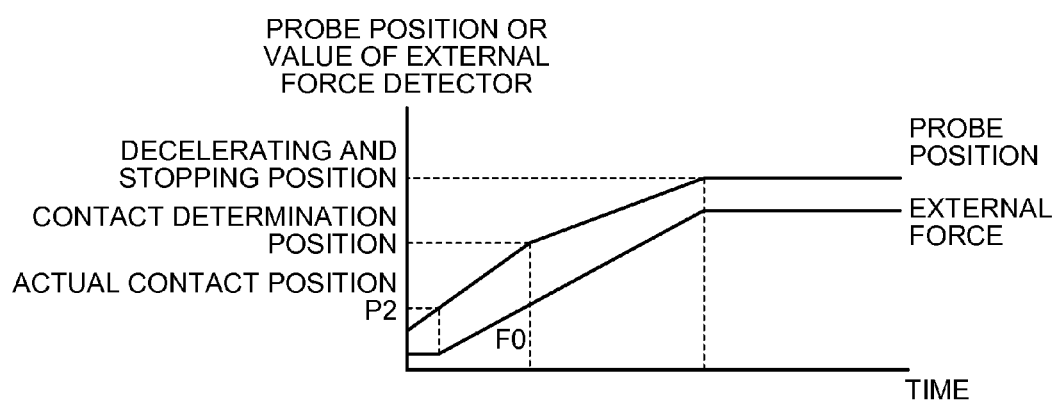
FIG. 12D is a graph of temporal changes of an external force and a probe position in the case shown in FIG. 12C.

The method according to the fifth embodiment is explained with reference to a flowchart shown in FIG. 11. Firstly, a contact-position detecting operation is instructed and a right supply position and a determination threshold value are set in a teaching process. At Step SA1, an operator performs a jog operation of the robot by using the teaching pendant 6, approaches the arm portion of the robot 1 to the workpiece 2 (part), brings the flexible probe 4 into contact with the workpiece 2 (part) to instruct a pressed position. A distance from the contact position to the pressed position is absorbed by the flexibility of the probe 4. This contact position can be calculated, in the same manner as Step S3 in the first embodiment, by using the values of each axis encoder of the robot 1, the mounting position and the design dimension of the probe 4, and the approach direction of the position detecting operation. Although the instruction of the contact-position detecting operation is basically performed as described above, it is preferable that the operator set an optimum position in each case for surely performing a state determination that is described later. For example, as shown in each diagram of FIGS. 12A to 12D, it is preferable to perform in advance a determination of a case where the workpiece 2 (part) is not supplied to a supply pallet 9 (FIG. 12A) and a case where the workpiece 2 (part) is supplied to the supply pallet 9 (FIG. 12C). In this case, a position P0 shown in FIGS. 12A and 12B is instructed to determine whether the part is supplied. The position P0 is a position that is pressed from a detection position P1 (actual contact position) when the part is not supplied by an amount equivalent to the contact determination position and the decelerating and stopping distance. Although a moving direction required for the contact determination and the decelerating and stopping distance can be theoretically calculated from the threshold value F0 of the contact determination, the elasticity of the probe, and the deceleration of each axis motor, it can also be set by the operator through instinct or on an empirical basis.

At Step SA2, the operator sets the workpiece 2 (part) at a right supply position, executes the position detecting operation instructed at Step SA1, detects the position, and acquires the right supply position. The acquired position data is recorded in the recording unit 54.

At Step SA3, a determination threshold value for a supply out of a proper range is set as a parameter for determining a supply state from a difference between the right supply position acquired at Step SA2 and the supply position acquired for each supply. This determination threshold value is the one set by the operator using the teaching pendant 6 and recorded in the recording unit 54. Although the determination threshold value for the supply out of a proper range sets the upper limit of a value with which the next operation cannot be performed because of a supply position error at the supply position at the time. For example, because positions of P1 and P2 are corresponding to a case with a part and a case with no part, respectively, in the example shown in FIGS. 12A to 12D, a detection position between P1 and P2 becomes the supply out of a proper range. That is, in this case, the determination threshold value for the supply out of a proper range becomes P1, a case where the contact detection position is larger than P1 can be determined as the supply out of a proper range, and a case where the contact detection position is equal to or smaller than P2 can be determined as a supply of the part. There are various reasons for the supply out of a proper range. For example, the reasons include a case where the part is placed in such a manner that it is deviated from a frame of the supply pallet, a machining error of the part and the like.

A determining method and a processing method in a reproduction process are explained next.

At Step SA4, the position detecting operation instructed at Step SA1 is performed on the supplied workpiece 2 (part), the position is detected, and the supply position is acquired.

At Step SA5, a difference between the supply position acquired at Step SA4 and the right supply position recorded in the recording unit 54 is calculated and compared with the determination threshold value for the supply out of a proper range set at Step SA3. If the difference between the acquired supply position and the right supply position is within the determination threshold value for the supply out of a proper range, it is determined to be in a state 1 (the part is supplied within a proper range), and the operation is continuously executed at Step SA61. If the difference between the acquired supply position and the right supply position is over the determination threshold value for the supply out of a proper range, it is determined to be in a state 2 (the part is supplied out of the proper range), and an operation start position is corrected by an amount of a supply error at Step SA62. In addition, as described in the first embodiment, when a position detection process error signal is received because the workpiece 2 (part) is not supplied, it is determined to be in a state 3 (the part is not supplied), and a process such as the one for resupplying the workpiece 2 (part) is set at Step SA63.

In the fifth embodiment, because the determination of the supply state of the workpiece 2 (part) is performed by a difference with the right supply position, it is not necessary for the detection position to be an absolute value, and it suffices to see a change relative to the right supply position. That is, link parameters such as link lengths, twist angles, and inter-axis distances of a robot and the tool data such as the probe dimension and the probe mounting position to be used in the probe end position calculation can be values including some errors. Furthermore, if the position detecting operation is performed not for all the axes of the robot but for a specified axis only, the same effect can be achieved by calculating the probe end position from the tool data of the operating axis and using a relative change of the contact position.

Figure 13:
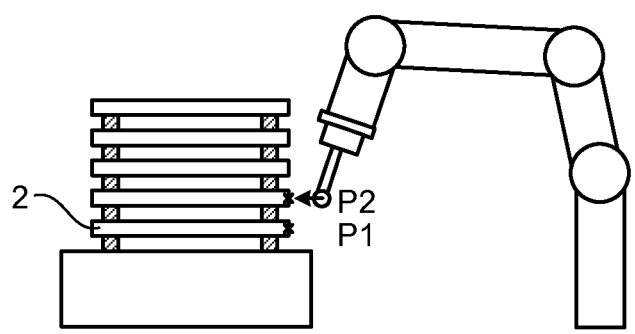
FIG. 13 is a schematic diagram for explaining an operation process of the robot shown in FIG. 11, which explains a process of making contact with a stacked target object in a play back process in a consecutive manner, detecting positions of the target objects, and determining the number of stacked target objects and a supply state of the target object from values of the detected positions.

In addition, although the process of setting the right supply position is performed in the teaching process in the fifth embodiment, it can be considered that the process is performed in the play back process. For example, for a workpiece 2 that is stacked as shown in FIG. 13, the contact is made with the workpiece 2 in a consecutive manner and the position is detected, and from a value of the detected position, it is possible to detect an arrangement error of the workpiece as well as to determine the number of objects stacked. That is, even if the right supply position is not set at the teaching process, it is possible to determine the supply state by using position detection data acquired at the play back process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for detecting a contact position where a robot makes contact with an object, the apparatus comprising:
   a probe that is attached to the robot, the probe being configured to make a displacement in a direction of making contact with the object in an elastic manner;
   a probe-position calculating unit configured to calculate a position of the probe of the robot in operation;
   a contact detecting unit configured to detect a contact state of the probe with the object;
   a contact-position calculating unit configured to, when the contact state of the probe is detected, derive the contact position based on a calculated position of the probe;
   an external-force detecting unit configured to detect an external force applied to the probe; and
   a recording unit configured to record therein the external force detected by the external-force detecting unit and the position of the probe calculated by the probe-position calculating unit in a time series manner, wherein
   when the contact state of the probe is detected, the contact-position calculating unit obtains a contact time of the probe based on the external force recorded in the recording unit and derives a position of the probe at a recorded contact time as the contact position of the robot, and
   the contact-position calculating unit obtains a time when a temporal change of a value of the external force recorded in the recording unit changes as the contact time.

2. The apparatus according to claim 1, wherein
   when the contact state of the probe is detected, the contact-position calculating unit obtains a contact start time of the probe based on the external force recorded in the recording unit and derives a position of the probe at the recorded contact start time as the contact position of the robot, and the contact detecting unit determines that the probe is in the contact state when the external force applied to the probe exceeds a predetermined value.

3. The apparatus according to claim 1, wherein a noise-reduction filtering process having a same temporal characteristic is performed on a detected external force and the calculated position of the probe.

4. The apparatus according to claim 1, wherein the contact detecting unit is configured as a sensor that electrically detects the contact state by a current conduction.

5. The apparatus according to claim 1, further comprising an upper-level controller that controls the robot, wherein
the robot includes servo motors and a motor control system that controls the servo motors based on an instruction from the upper-level controller,
the upper-level controller includes a built-in calculation model for simulating the motor control system, and
the probe-position calculating unit calculates the position of the probe by using an output value obtained when instruction data to the servo motors is input to the calculation model.

6. The apparatus according to claim 1, wherein the probe is configured to be attached to the robot in a detachable manner or to be stored in the robot.

7. An apparatus for detecting a contact position where a robot makes contact with an object, the apparatus comprising:
a probe that is attached to the robot, the probe being configured to make a displacement in a direction of making contact with the object in an elastic manner;
probe-position calculating means for calculating a position of the probe of the robot in operation;
contact detecting means for detecting a contact state of the probe with the object;
contact-position calculating means for, when the contact state of the probe is detected, deriving the contact position based on a calculated position of the probe;
external-force detecting means for detecting an external force applied to the probe; and
recording means for recording therein the external force detected by the external-force detecting means and the position of the probe calculated by the probe-position calculating means in a time series manner, wherein
when the contact state of the probe is detected, the contact-position calculating means obtains a contact time of the probe based on the external force recorded in the recording means and derives a position of the probe at a recorded contact time as the contact position of the robot, and
the contact-position calculating means obtains a time when a temporal change of a value of the external force recorded in the recording means changes as the contact time.

8. A method for detecting a contact position of a robot, the method comprising:
attaching a probe that is configured to make a displacement in a direction of contacting with an object in an elastic manner to the robot;
performing a position control of the robot;
calculating a position of the probe;
detecting a contact state of the probe with the object;
decelerating and stopping, when the contact state of the probe is detected, the robot and deriving the contact position based on a calculated position of the probe;
detecting an external force applied to the probe; and
recording a detected external force and the calculated position of the probe in a time series manner, wherein
the detecting of the contact state of the probe with the object includes detecting the contact state of the probe based on the detected external force, and
when the contact state of the probe is detected, the deriving of the contact position includes obtaining a contact time of the probe based on a recorded external force and deriving a position of the probe at a recorded contact time as the contact position of the robot,
the detecting of the contact state of the probe with the object includes detecting that the probe is in the contact state when the external force applied to the probe exceeds a predetermined value, and
the predetermined value is set to a value larger than a force caused by a disturbance to the robot.

9. The method according to claim 8, wherein
the detecting of the contact state of the probe with the object includes detecting the contact state electrically by a current conduction, and
the deriving the contact position includes deriving a position of the probe at a time when the contact state is detected by the current conduction as the contact position.

10. The apparatus according to claim 1, further comprising a decelerating and stopping unit configured to control the robot to decelerate and stop when the contact state of the probe is detected.

11. The apparatus according to claim 2, wherein the predetermined value is set to a value larger than a force caused by a disturbance to the robot.

12. The apparatus according to claim 11, wherein the predetermined value is set to a value larger than a force generated when the probe is first brought into contact with the object.

13. The method according to claim 8, wherein the predetermined value is set to a value larger than a force generated when the probe is first brought into contact with the object.

14. A non-transitory computer readable storage medium having stored therein a program for detecting a contact position of a robot that includes a probe that makes a displacement in a direction of contacting with an object in an elastic manner, the program causing a computer to execute a process comprising:
performing a position control of the robot;
calculating a position of the probe;
detecting a contact state of the probe with the object;
decelerating and stopping, when the contact state of the probe is detected, the robot and deriving the contact position based on a calculated position of the probe;
detecting an external force applied to the probe; and
recording a detected external force and the calculated position of the probe in a time series manner, wherein
the detecting of the contact state of the probe with the object includes detecting the contact state of the probe based on the detected external force, and
when the contact state of the probe is detected, the deriving of the contact position includes obtaining a contact time of the probe based on a recorded external force and deriving a position of the probe at a recorded contact time as the contact position of the robot,
the detecting of the contact state of the probe with the object includes detecting that the probe is in the contact state when the external force applied to the probe exceeds a predetermined value, and
the predetermined value is set to a value larger than a force caused by a disturbance to the robot.

15. An apparatus for detecting a contact position where a robot makes contact with an object, the apparatus comprising:
- a probe that is attached to the robot, the probe being configured to make a displacement in a direction of making contact with the object in an elastic manner;
- a probe-position calculating unit configured to calculate a position of the probe of the robot in operation;
- a contact detecting unit configured to detect a contact state of the probe with the object;
- a contact-position calculating unit configured to, when the contact state of the probe is detected, derive the contact position based on a calculated position of the probe;
- an external-force detecting unit configured to detect an external force applied to the probe; and
- a recording unit configured to record therein the external force detected by the external-force detecting unit and the position of the probe calculated by the probe-position calculating unit in a time series manner, wherein when the contact state of the probe is detected, the contact-position calculating unit obtains a contact time of the probe based on the external force recorded in the recording unit and derives a position of the probe at a recorded contact time as the contact position of the robot, when the contact state of the probe is detected, the contact-position calculating unit obtains a contact start time of the probe based on the external force recorded in the recording unit and derives a position of the probe at the recorded contact start time as the contact position of the robot, the contact detecting unit determines that the probe is in the contact state when the external force applied to the probe exceeds a predetermined value, and the predetermined value is set to a value larger than a force caused by a disturbance to the robot.

* * * * *